US008589892B2

(12) United States Patent
Fournier et al.

(10) Patent No.: US 8,589,892 B2
(45) Date of Patent: Nov. 19, 2013

(54) VERIFICATION OF SPECULATIVE EXECUTION

(75) Inventors: Laurent Fournier, Givat Ela (IL); Anatoly Albert Koyfman, Kiriat Yam (IL); Michal Rimon, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/951,049

(22) Filed: Nov. 21, 2010

(65) Prior Publication Data

US 2012/0131386 A1 May 24, 2012

(51) Int. Cl.
*G06F 9/44* (2006.01)

(52) U.S. Cl.
USPC .................... 717/130; 717/124; 717/135

(58) Field of Classification Search
None
See application file for complete search history.

(56) References Cited

U.S. PATENT DOCUMENTS

| | | | | |
|---|---|---|---|---|
| 5,202,889 | A * | 4/1993 | Aharon et al. | 714/739 |
| 5,561,776 | A * | 10/1996 | Popescu et al. | 712/239 |
| 5,592,636 | A * | 1/1997 | Popescu et al. | 712/239 |
| 5,729,554 | A * | 3/1998 | Weir et al. | 714/739 |
| 5,805,470 | A * | 9/1998 | Averill | 703/27 |
| 5,923,863 | A * | 7/1999 | Adler et al. | 712/216 |
| 5,974,538 | A * | 10/1999 | Wilmot, II | 712/218 |
| 6,079,014 | A * | 6/2000 | Papworth et al. | 712/233 |
| 6,112,312 | A * | 8/2000 | Parker et al. | 714/32 |
| 6,523,151 | B2 * | 2/2003 | Hekmatpour | 716/106 |
| 6,745,160 | B1 | 6/2004 | Ashar et al. | |
| 7,266,673 | B2 | 9/2007 | Filippo et al. | |
| 7,290,174 | B1 * | 10/2007 | Gray et al. | 714/33 |
| 7,299,382 | B2 * | 11/2007 | Jorapur | 717/124 |
| 7,302,556 | B2 * | 11/2007 | Ludden et al. | 712/239 |
| 7,401,322 | B1 * | 7/2008 | Shagam et al. | 717/130 |
| 7,434,101 | B2 | 10/2008 | Adir et al. | |
| 7,533,294 | B2 | 5/2009 | Mishra et al. | |
| 7,574,341 | B1 | 8/2009 | Maly et al. | |
| 7,627,843 | B2 * | 12/2009 | Dozorets et al. | 717/124 |
| 7,644,399 | B2 * | 1/2010 | Craske et al. | 717/135 |
| 7,836,343 | B2 * | 11/2010 | Feng et al. | 717/135 |
| 7,877,742 | B2 * | 1/2011 | Duale et al. | 717/130 |
| 8,046,746 | B2 * | 10/2011 | Tillmann et al. | 717/135 |
| 8,117,499 | B2 * | 2/2012 | Copty et al. | 717/124 |
| 8,397,217 | B2 * | 3/2013 | Goryachev et al. | 717/124 |
| 8,438,000 | B2 * | 5/2013 | Katz et al. | 703/13 |

(Continued)

OTHER PUBLICATIONS

Patterson, David A. and Hennessy, John L., Computer Organization and Design: The Hardware / Software Interface, c2009, Morgan Kaufmann Publishers, 4th, p. 373.*

(Continued)

*Primary Examiner* — Thuy Dao
*Assistant Examiner* — Ravi K Sinha
(74) *Attorney, Agent, or Firm* — Ziv Glazberg (57) ABSTRACT

A Design-Under-Test (DUT) may be designed to perform speculative execution of a branch path prior to determination whether the branch path is to be performed. Verification of the operation of DUT in respect to the speculative execution is disclosed. A template may be used to generate a plurality of tests. In addition to standard randomness of the tests to various parameters in accordance with the template, the tests may also differ in their respective speculative execution paths. The tests are partitioned by a generator into portions to be placed in speculative paths and portions to be placed in non-speculative paths. The generator may provide for a variance in portions. The generator may provide for nested speculative paths.

20 Claims, 4 Drawing Sheets

(56) References Cited

U.S. PATENT DOCUMENTS

| | | | | |
|---|---|---|---|---|
| 2002/0056037 | A1* | 5/2002 | Wolrich et al. | 712/215 |
| 2004/0205725 | A1* | 10/2004 | Lambert | 717/124 |
| 2005/0000874 | A1 | 1/2005 | Jinno et al. | |
| 2005/0010898 | A1* | 1/2005 | Ogawa et al. | 717/124 |
| 2005/0081102 | A1 | 4/2005 | Ludden et al. | |
| 2005/0188271 | A1 | 8/2005 | West et al. | |
| 2006/0123402 | A1* | 6/2006 | Craske et al. | 717/135 |
| 2006/0230392 | A1* | 10/2006 | Duale et al. | 717/130 |
| 2006/0242391 | A1* | 10/2006 | Elwood | 712/238 |
| 2007/0150873 | A1* | 6/2007 | Damme et al. | 717/135 |
| 2007/0277130 | A1 | 11/2007 | Lavelle | |
| 2009/0007077 | A1* | 1/2009 | Musuvathi et al. | 717/130 |
| 2009/0070570 | A1* | 3/2009 | Choudhury et al. | 712/244 |
| 2010/0011345 | A1* | 1/2010 | Hickerson et al. | 717/130 |
| 2010/0287534 | A1* | 11/2010 | Vangala et al. | 717/124 |
| 2011/0004865 | A1* | 1/2011 | Brown et al. | 717/125 |
| 2011/0131031 | A1* | 6/2011 | Katz et al. | 703/28 |

OTHER PUBLICATIONS

Hennessy, John L and Patterson, David A., Computer Architecture: A Quantitative Approach, c2003, Morgan Kaufmann Publishers 3rd edition, pp. 239-240.*

Pradip Bose, Performance test case generation for microprocessors, [Online] VLSI Test Symposium, 1998. Proceedings. 16th IEEE, [Retrieved from the Internet] <http://ieeexplore.ieee.org/stamp/stamp.jsp?tp=&arnumber=670849> 6 pages.*

Ravotto et al., Design validation of multithreaded architectures using concurrent threads evolution. [Online] 2009, In Proceedings of the 22nd Annual Symposium on Integrated Circuits and System Design: Chip on the Dunes (SBCCI '09) [Retrieved from the Internet] <http://delivery.acm.org/10.1145/1610000/1601964/a53-ravotto.pdf> 6 pages.*

Qiao-yan et al., A Functional Verification Method for Pipelined DSP, [online] Solid-State and Integrated Circuits Technology, 2004. Proceedings. 7th International Conference on, [Retrieved from the Internet] <http://ieeexplore.ieee.org/stamp/stamp.jsp?tp=&arnumber=1435247> 4 pages.*

John L. Hennessy and David Patterson, "Computer Architecture—A Quantitative Approach" [Book], 2003, pp. 104-114.

Chandra et al., "AVPGEN—A Test Generator for Architecture Verification", IEEE Transactions on VLSI Systems, Jun. 1995.

Eric Hennenhoefer and Melanie Typaldos, "The Evolution of Processor Test Generation Technology", Obsidian Software, Aug. 2008. URL: http://www.obsidiansoft.com/index.php/Processor_Verification/Overview/Evolution_of_Processor_Test_Generation_Technology.html.

M. Behm et al., "Industrial experience with test generation languages for processor verification", Proceedings of the 41st annual conference on Design automatio, DAC'04, Jun. 7-11, 2004, San Diego, Californian.

* cited by examiner

VERIFICATION OF SPECULATIVE EXECUTION

BACKGROUND

The present disclosure relates to functional verification of a processor hardware design in general, and to test generation of stimuli operative to stimulate the design to perform speculative execution, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

Hardware-based speculation increases the parallel execution of instructions by speculating on the outcome of conditional branch instructions and executing the instruction stream as if the speculated guess is correct. With speculation the processor fetches, issues and executes instructions, but the results of the execution are not written back into architected resources until the speculation is resolved. This may be done by separating the completion stage from the commit stage. Results from completed instructions are forwarded into other instructions to allow their speculative execution.

In hardware-based speculation, in instruction after which the control may flow into two or more different locations, speculative execution may be used. Such an instruction is referred to as a branch instruction. A branch instruction may define two or more branch legs. The branch instruction may be conditional and define a condition which defines which of the branch legs is to be taken. For example, the branch instruction may define that if a condition is held, a first branch leg is taken, and if the condition is not held, a second branch leg is taken. During execution, the taken branch leg is executed. However, the non-taken branch leg (also referred to as the Branch-leg Not Taken, or BNT) may also be executed in speculative execution, whose results may be dropped later on. In some exemplary embodiments, the taken branch leg may be executed speculatively, and those results may be used later on.

Once the speculation is resolved, in case the speculation was correct (i.e., the taken branch leg was executed speculatively), all the instructions which executed speculatively are allowed to commit—i.e. write their results into architected resources in program order. In case the speculation was wrong (i.e., the BNT was executed speculatively), the speculative execution is revoked by performing a rollback operation. The rollback operation may require performing a complex chain of undo operations within the processor.

Implementing a speculative execution mechanism considerably complicates processor design. It requires the addition of a set of hardware buffers that hold the results of instructions that finished executing but have not yet committed, and also requires the ability to pass results among speculatively executing instructions. Hence, hardware-based speculation is somewhat bug-prone, and its verification is an important task.

Functional verification of processor designs is based largely on test generation techniques. These techniques generate stimuli in the form of machine-language programs. Faulty behavior of the design is detected by driving the stimuli into a design simulator and comparing the actual behavior of the design with the expected behavior implied by the input stimuli. However, in some cases, another test platform may be used instead of a simulator, such as a hardware emulator, a hardware accelerator, a post-silicon product (e.g., a prototype or a wafer), or the like.

Test generators may be generally classified into two distinct groups. Layout generators are configured to generate a test based on a template which describes the layout of the test. In other words, the layout of instructions in the template is the layout of instructions of the generated test as well. Flow generators are configured to generate a test based on a template which describes the order of execution. Hence, in a flow generator, an order of instructions in the template defines an order of execution in the test, and not necessarily the layout of the test.

The two different generators are noticeably different with respect to branching instructions. In a layout generator, the instruction succeeding a branch instruction in the template is placed in memory right after the branch instruction. In a flow generator, the placement of the instruction succeeding the branch depends on whether the branch is taken or not taken. If the branch is not taken, the succeeding instruction in the template is placed right after the branch instruction, however if the branch is taken, the succeeding instruction is placed at the target address of the branch instruction, and the placement continuity is broken.

Dynamic generators utilize a reference model to simulate an expected state of the target design during the generation of the test, and therefore are able to provide for tests of higher quality as such a dynamic generator may generate more interesting stimuli based on a current expected state of the design. Dynamic generation is disclosed in U.S. Pat. No. 5,202,889 titled "Dynamic Process for the generation of biased pseudo-random test patterns for the functional verification of hardware designs", which is hereby incorporated by reference. In dynamic generation the generator generates an instruction, executes the generated instruction on a reference model to calculate the new machine state, and generates the next instruction based on the updated state. In some exemplary embodiments, flow generators are dynamic generators.

SUMMARY

One exemplary embodiment of the disclosed subject matter is a computer-implemented method for generating a test for a Design-Under-Test (DUT) based on a template, wherein the method is performed by a processing unit, the method comprising: partitioning the template into at least a first portion and a second portion, wherein the first portion is determined to be executed in speculative execution by the DUT; injecting a branch instruction operative to cause the DUT to perform speculative execution, the branch instruction defines at least a speculative branch leg and a non-speculative branch leg, wherein the DUT is operative to perform speculative execution of the speculative branch leg; generating a first set of instructions based on the first portion of the template, wherein the first set of instructions are placed in the speculative branch leg; and generating a second set of instructions, wherein the second set of instructions are placed in the non-speculative branch leg.

Another exemplary embodiment of the disclosed subject matter is a computerized apparatus having a processing unit, the apparatus comprising: a template obtainer operative to obtain a template descriptive of a test scenario for a Design-Under-Test (DUT); a partitioning module operative to partitioning the template into at least a first portion and a second portion, wherein the first portion is determined to be executed in speculative execution by the DUT; a branch injector operative to inject a branch instruction to the test, wherein the branch instruction is operative to cause the DUT to perform speculative execution, the branch instruction defines a speculative branch leg and a non-speculative branch leg, wherein the DUT is operative to perform speculative execution of the speculative branch leg; an instruction generator operative to generate instructions based on the template; an instruction placer operative to place the generated instructions in the test, wherein the instruction placer is operative to place instructions associated with the first portion in the speculative branch leg.

Yet another exemplary embodiment of the disclosed subject matter is a computer program product generating a test for a Design-Under-Test (DUT) based on a template, the product comprising: a non-transitory computer readable medium; a first program instruction for partitioning the template into at least a first portion and a second portion, wherein the first portion is determined to be executed in speculative execution by the DUT; a second program instruction for injecting a branch instruction operative to cause the DUT to perform speculative execution, the branch instruction defines at least a speculative branch leg and a non-speculative branch leg, wherein the DUT is operative to perform speculative execution of the speculative branch leg; a third program instruction for generating a first set of instructions based on the first portion of the template, wherein the first set of instructions are placed in the speculative branch leg; a fourth program instruction for generating a second set of instructions, wherein the second set of instructions are placed in the non-speculative branch leg; and wherein said first, second, third and fourth program instructions are stored on said computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to verify functional operation of a Design Under Test (DUT) in respect to speculative execution. Another technical problem is to provide for a test generator capable of generating one or more tests which are executed, at least in part, in a speculative execution. Yet another technical problem is to provide for a generator capable of creating, based on a single template describing a scenario, a plurality of different embodiments of the scenario, wherein in each embodiment a different portion of the scenario is performed in a speculative execution.

One technical solution is to partition a template into portions, wherein some portions are generated so as to be executed speculatively. A branch instruction operative to cause the DUT to perform speculative execution may be generated and inserted to the test. In some exemplary embodiments, the branch instruction is determined so as to cause the DUT to perform speculative execution of a non-taken leg of a branch. Another technical solution is to insert a branch instruction operative to cause the DUT to speculatively execute a BNT while speculatively executing another BNT. Therefore, performing nested speculative executions. Yet another technical solution is to partition the template based on predetermined annotations in the template. Yet another technical solution is to utilize a reference model for simulating state of the DUT during execution. The reference model may be adapted to simulate speculative execution and performing of a rollback in response to a determination that the speculative execution performed is in respect to a BNT. Yet another technical solution is to provide for a flow generator operative to generate dynamically a test based on a template, where the flow generator is further operative to determine portions of the template to be generated and placed so as to be performed during speculative execution.

One technical effect of utilizing the disclosed subject matter is to generate plurality of tests based on a single template, where each test may cause the DUT to perform a different portion of the scenario defined by the template in speculative execution. Another technical effect is enabling a user to design a scenario to be tested in a template and using the scenario to test the DUT's operation when performing speculative execution of a portion of the scenario. The determination of which portion is performed in speculative execution may be random, biased, or the like. The disclosed subject matter may enable a verification engineer to verify correctness of the speculative execution modules of the DUT without requiring substantial manual work. Yet another technical effect is to generate a test that is configured to cause speculative execution of a BNT, and thus stimulate the rollback mechanism of the DUT. Yet another technical effect is enabling reuse of a template designed to verify a first DUT in respect to a second DUT, even when the two DUTs differ in what causes each of them to perform speculative execution.

Figure 1:
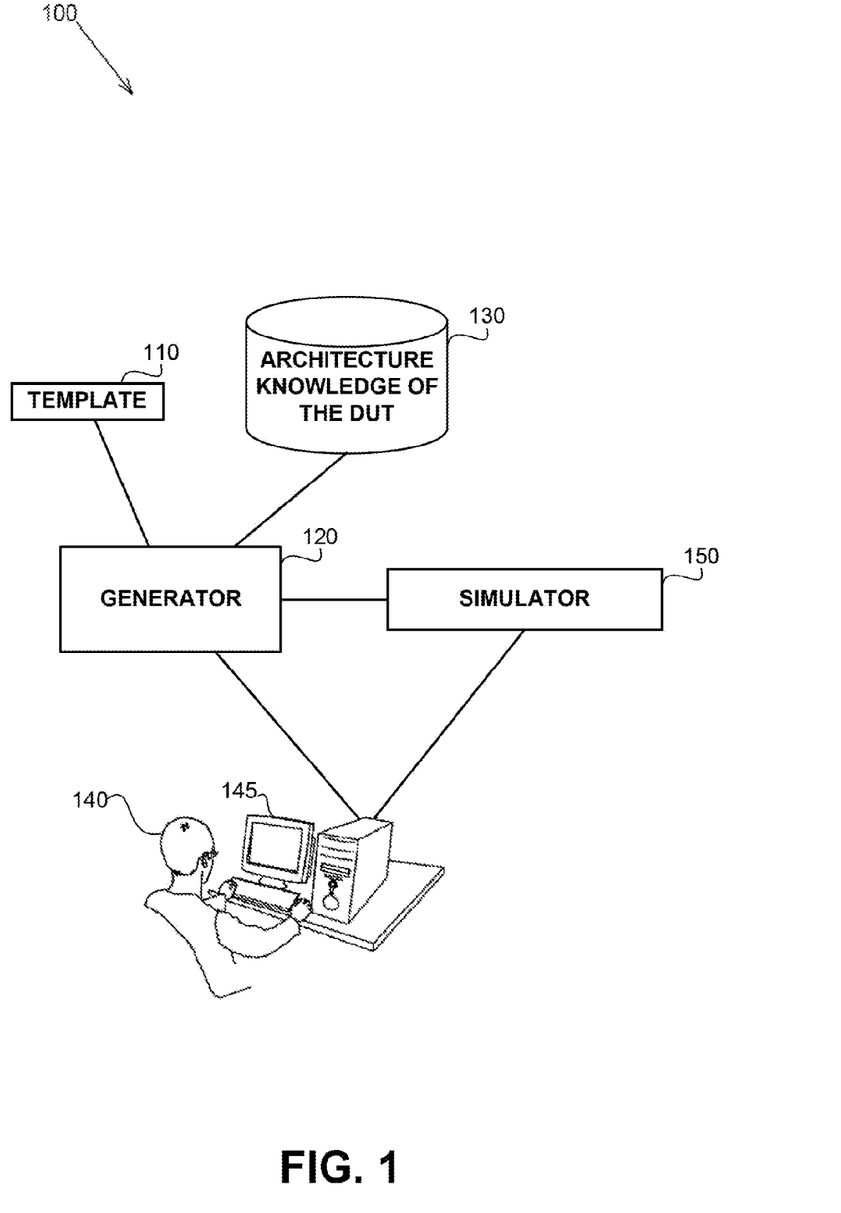
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

A computerized environment 100 may comprise a generator 120. The generator 120 may be a flow generator, a layout generator, a dynamic generator, an online generator, and offline generator or the like. The generator 120 may be configured to obtain a template 110. The template 110 may be defined using a formal descriptive language, such as a context-free formal language. The template 110 may define a scenario of a test operated by the DUT. As an example only, the following template is used throughout the detailed description. However, it is specifically noted that the disclosed subject matter is not limited to this example, its format or any other aspect thereof. The example is provided for the purpose of ease of explanation only.

Generate {STORE}
    Repeat {Generate {random instruction}}
    Generate {LOAD} with {SOURCE contained in STORE access}

The template provides description of a scenario in which a first instruction is any STORE instruction, after the STORE instruction, there is any number of instructions that are chosen randomly, and finally, any LOAD instruction may be provided. The template further provides that the LOAD instruction is of a source address that is contained (either fully or partially) in an address accessed by the store instruction. The template, therefore, provides a scenario in which data is stored and later on loaded (at least partially). Such a scenario may be useful to exercise cache mechanisms of the DUT, use of a store buffer in the DUT, or the like. As the template doesn't restrict the STORE instruction, it may be any type of store instruction, storing any data, at any address. In the same manner, the LOAD instruction is not limited to a specific type of load instruction, to a specific target address, or the like. The LOAD instruction, however, is limited to the source address from which loading is performed.

The generator 120 may be configured to generate a test based on the template 110. The generator 120 may determine characteristic of the test that are not fully determined by the template 110, such as a type of STORE instruction, a store target address, a stored data, a load target address and a load source address. The load source address may be determined such that is holds the defined characterization of "SOURCE contained in STORE access". In some exemplary embodiments, the generator 120 may utilize architecture knowledge of the DUT, such as retained in a database 130, in order to bias the generated test to be of a relatively higher quality. In some exemplary embodiments, the architecture knowledge may be used, for example, to determine which load source address may be used, so as to cause a specific event such as a cache hit, usage of a store-load buffer, a page fault, or the like. In some exemplary embodiments, the architecture knowledge may be indicative of operations likely to cause speculative execution of a branch leg. In some exemplary embodiments, the architecture knowledge may indicate a number of maximum nested speculative paths that may be executed by the DUT.

In some exemplary embodiments, a simulator 150 may be configured to simulate execution of a stimuli generated by the generator 120 (e.g., a test). The simulator 150 may be configured to simulate execution of the stimuli by the DUT. In some exemplary embodiments, the simulator 150 may be an HDL simulator. In some exemplary embodiments, the simulator 150 and the generator 120 may be comprised by a single processing environment, and therefore the generator 120 may be considered an online generator. In some exemplary embodiments, the generator 120 may be comprised by a different processing environment than that of the simulator 150, and therefore the generator 120 may be considered an offline generator. It will be further noted that the generator 120 may use an internal simulator, referred to as a reference model, to simulate state of the DUT. The internal simulator is used to facilitate generation of the test by the generator 120, and may be performed in addition to simulation by the simulator 150.

In some exemplary embodiments, a user 140 may interact with the generator 120 and/or the simulator 150 using a Man-Machine Interface (MMI) 145 such as a terminal, a display, a keyboard, an input device or the like. The user 140 may define the template 110, may provide the architecture knowledge 130, or the like. In some exemplary embodiments, the user 140 may provide a maximum number of speculative execution paths to be generated by the generator 120. The user 140 may provide rules, commands, preferences, and parameters to the generator 120 and/or to the simulator 150. The user 140 may view output of the generator 120 and/or simulator 150. Based upon the output, the user 140 may determine to design a new test, to modify the template 110, or the like. The user 140 may further identify bugs, report the identified bugs and/or correct the identified bugs.

In some exemplary embodiments, the template 110 may be automatically defined based on commands, rules, definition, preferences and the like. In some exemplary embodiments, the template may be generated automatically, and not manually, based on, for example, micro-architectural model.

Figure 2:
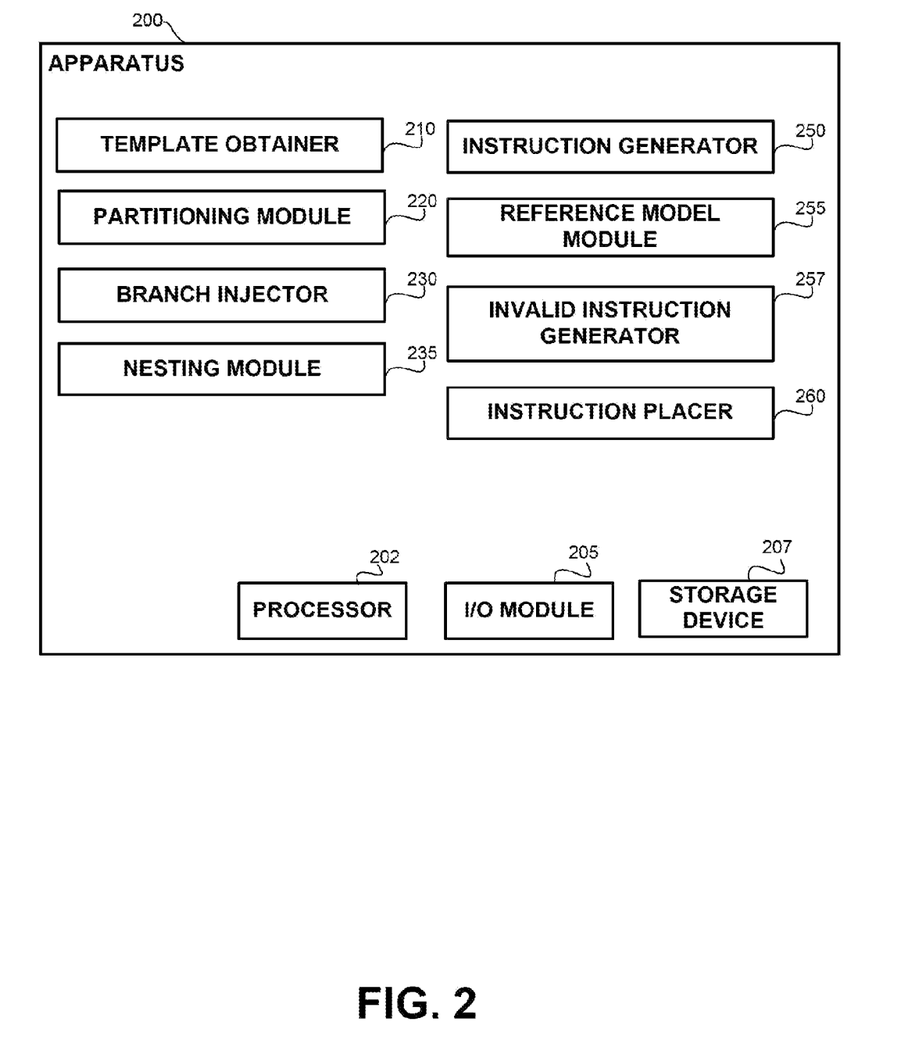
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 120 of FIG. 1, may be configured to generate a test based on a template. The test may be configured so as to exercise the DUT's speculative execution mechanism.

In some exemplary embodiments, a template obtainer 210 may be configured to receive, retrieve or otherwise obtain a template, such as 110 of FIG. 1. The template obtainer 210 may obtain the template from a file, a database, a storage device, or the like. In some exemplary embodiments, the template obtainer 210 may utilize an I/O module 205 to obtain the template. In some exemplary embodiments, the template may be manually designed by a user, such as 140 of FIG. 1, may be automatically devised, or the like.

In some exemplary embodiments, the template may define partitioning points indicative of locations which may begin a new speculative path. In some exemplary embodiments, partitioning points may be defined using annotations, such as comments, using predetermined predicates, or the like. In some exemplary embodiments, partitioning points may be defined manually by a user, such as 140 of FIG. 1. In some exemplary embodiments, partitioning points may be defined automatically, such as before any new instruction in the template, before a subset of possible instructions or the like. Referring to the exemplary template, a partitioning point may be before the STORE instruction, before the LOAD instruction, before the block created in respect to the repeated generation of random instructions, or the like. In one exemplary embodiment, partitioning points may be defined before the STORE instruction and before the LOAD instruction, therefore enabling generation of tests exercising speculative execution which, if not rollbacked properly, may affect execution of the taken branch leg (which is executed in a non-speculative manner).

In some exemplary embodiments, a partitioning module 220 may be operative to partition the template into portions. In some exemplary embodiments, the partitioning module 220 may determine partitioning based on partitioning points in the template. In some exemplary embodiments, the partitioning module 220 may be operative to determine portions of the template, where each portion may be executed by the test in a speculative execution or in a non-speculative execution. The determination by the partitioning module 220 may be random, pseudo-random, biased, non-deterministic, or the like, therefore enabling generation of tests that differ in respect to which portion is executed in speculative execution. In some exemplary embodiments, a partitioning point may be used as a nested partitioning point that splits a speculative branch leg into at least two portions—a speculative portion and a non-speculative portion. In some exemplary embodiments, the partitioning module 220 may determine a partitioning point to be a nested partitioning point and therefore enable generation of nested speculative execution paths.

In some exemplary embodiments, a branch injector 230 may be operative to add a branch instruction to the test. The branch instruction may be a conditional branch instruction that has at least two possible continuing paths or branch legs. As an example, a conditional branch instruction may modify the instruction pointer to a target address (i.e., perform a jump operation) or increase the instruction pointer by one location. In some exemplary embodiments, the branch instruction may be an implicit branch instruction that is operable to define two or more alternative branch legs in an implicit manner, as opposed to an explicit control flow definition such as provided by a conditional jump instruction or a BC instruction. For example, the branch instruction may be a context-switching instruction, such as an instruction which is operative to change the address translation rules of the DUT. The execution of an implicit branching instruction may trigger the DUT to perform a rollback operation with respect to all the instructions which succeed the branch instruction and have already been fetched and may have started execution. The DUT may be required to re-fetch the succeeding instructions in accordance with the translation rules affected by the branch instruction. Such an execution and rolling back are considered, with respect to the present disclosure, as speculative execution.

In some exemplary embodiments, the branch instruction inserted by the branch injector 230 may not be directly associated with a requirement defined by the template. In our example—it is not associated with the STORE instruction, the random instruction, or the LOAD instruction.

The branch instruction may define inherently a speculative branch leg (also referred to as a speculative branch) and a non-speculative branch leg (also referred to as a non-speculative branch). The speculative branch leg is operative to be executed in speculative execution by the DUT. In some exemplary embodiments, the non-speculative branch leg is the taken branch leg, and therefore computations of the speculative execution of the speculative branch leg may be revoked. In some exemplary embodiments, the branch injector 230 may determine, based on a reference model (such as maintained by a reference model module 255), which branch leg may be taken by the DUT. The BNT may be determined to be the speculative branch leg. In some exemplary embodiments, the branch instruction is generated so as to cause speculative execution of the speculative branch leg. For example, in some exemplary embodiments, there may be architectural mechanisms for controlling static speculation. The branch injector 230 may be biased towards generating an instruction that may cause the DUT to speculate that the BNT is taken and/or that the taken branch leg is speculated to be not taken. In some exemplary embodiments, biasing the branch instruction may be performed in accordance with the teachings of U.S. Patent Publication 2005/0,081,102 titled "METHOD, APPARATUS AND COMPUTER PROGRAM PRODUCT FOR IMPLEMENTING LEVEL BIAS FUNCTION FOR BRANCH PREDICTION CONTROL FOR GENERATING TEST SIMULATION VECTORS", which is hereby incorporated by reference.

In some exemplary embodiments, the branch injector 230 may be operative to generate a branch instruction with a target address. The target address may be determined randomly, pseudo-randomly, non-deterministically, in a biased manner, or the like. The target address may be determined later on, based on the generation of additional instructions, such as to ensure that the target address is far enough to provide for a speculative branch leg in between. Consider the following example, based on the exemplary template:

0001 bc 0004
    0002 store
    0003 noise instruction
    0004 load colliding with store By inserting the conditional branch instruction prior to the store instruction, a speculative path is generated. Assuming the branch instruction (bc) is determined to be taken upon execution, the speculative path may be determined to be the instructions in addresses 0002-0003. However, prior to generating the store and noise instruction, determining that target address (0004) may result in not leaving enough memory space for the instructions of the speculative path. In some exemplary embodiments, a label may be used and later on defined.

In some exemplary embodiments, a nesting module 235 may be operative to invoke the branch injector 230 so as to provide for nested speculative paths. In some exemplary embodiments, the nesting module 235 may be configured to generate at most a predetermined number of nested speculative paths, such as the maximum number of consecutive speculative executions that the DUT may initiate. For example, a DUT may support of up to three (3) nested speculative executions. In other words, while performing speculative execution, an outcome of a branch instruction to be performed during the speculative execution may be speculated. Based on the speculated outcome, a first nested speculative execution may be performed. During which, a second nested speculative execution may likewise be commenced. The nesting module 235 may be configured to generate a test that is configured to invoke nested speculative executions, and therefore, test the validity of the DUT in such scenarios.

Referring again to the exemplary template, one test may be:
    bc TARGET1
    store
    noise instruction noise instruction
be TARGET2
load colliding with store
TARGET2: nop
TARGET1: nop Assuming branches are not taken but are speculated to be taken, the test provides for a speculative execution of the store, noise and the second branch instruction. The second branch instruction provides for a nested speculative execution, which causes the load instruction to be executed in speculative execution.

In some exemplary embodiments, an instruction generator 250 may be operative to generate instructions based on the template. The instruction generator 250 may be operative to generate one or more instructions based on a single or a set of definitions in the template. Some characteristic of the instruction may be determined in non-deterministic, randomly, biased, pseudo-random or a similar manner. The instruction generator 250 may provide for different generated instruction at different executions, thereby providing for different instructions in two tests that are generated based on a single template.

In some exemplary embodiments, an invalid instruction generator 257 may be configured to generate invalid instructions. Invalid instructions may be instructions that are not recognized by the DUT, not applicable at certain states of the DUT and provided in such a state, or the like. In some exemplary embodiments, generating invalid instructions to be operated in speculative execution may provide for a relatively high quality test, as the input of the DUT is generally valid, however invalid operations during speculative execution should be handled by the DUT. In some exemplary embodiments, the invalid instruction generator 257 is operative to insert invalid instructions only in speculative paths, therefore a generated invalid instruction may only be executed speculatively.

In some exemplary embodiments, a reference model module 255 may be operative to simulate an expected state of the DUT. The reference model may simulate execution of each generated instruction, as it is being generated. In response to simulating execution of the generated instruction, a next instruction may be generated taking into account the state of the reference model. The reference model module 255 may be operatively coupled to the instruction generator 250. In some exemplary embodiments, the reference model module 255 may enable the generator to be a dynamic generator.

In some exemplary embodiments, the reference model module 255 may be operative to perform a rollback of modifications performed during a speculative execution. Consider the following test as an example:
   bc TARGET
   load colliding with store
   END
TARGET: store
   noise instruction Assuming that the branch instruction (bc) is not taken but is speculated be taken, the speculative branch leg comprises the store and noise instructions. The test may cause the DUT (or simulator thereof) to execute in a speculative manner the store and noise instructions, which are in the BNT in this example. After the speculative execution, a determination that the branch instruction is not taken may be performed and thereby the results of the speculative execution should be dropped and previous values should be restored in a rollback operation. After rolling back the speculative execution, the load instruction of the non-speculative branch leg may be performed. In some exemplary embodiments, the DUT, once executed or simulated to be executed, may fail to correctly rollback the speculative execution. Therefore, the load instruction may load information stored by the store instruction. In such a case, a bug may be discovered.

In some exemplary embodiments, rollbacking of a nested speculative execution may be performed.

It will be noted, that though the reference model may be rolled back, some information associated with the generation of the speculative path may be retained. For example, an address used by the store instruction may be retained in order to be reused in generating the load instruction. As another example, a knowledge about a state of the store buffer may be retained so as to be used during the generation of the load instruction as to be operative to manipulate the store buffer.

In some exemplary embodiments, the reference model module 255 may be operative to simulate execution of an invalid instruction, such as generated by the invalid instruction generator 257. The reference model module 255 may be operative to simulate execution of the invalid instruction during speculative execution and may enable rolling back such execution.

In some exemplary embodiments, an instruction placer 260 may be operative to place a generated instruction in the test. The generated instruction may be placed in a portion of the test that is to be executed in speculative execution. The generated instruction may be placed in a portion of the test that is to be executed in a non-speculative execution. The instruction may be placed in a consecutive address to the address of a previously placed instruction. The instruction may be placed in a target address to which a branch instruction, such as injected by the branch injector 230, may jump to in case the branch instruction is taken.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1.

In some exemplary embodiments, the apparatus 200 may comprise a storage device 207. The storage device 207 may be a hard disk drive, a Flash disk, a Random Access Memory (ROM), a memory chip, or the like. In some exemplary embodiments, the storage device 207 may retain program code operative to cause the processor 202 to perform acts associated with any of the subcomponents of the apparatus 200. In some exemplary embodiments, the storage device 207 may retain a state if the reference model, information useful for generation of additional instructions, or the like.

In some exemplary embodiments, the apparatus 200 may be operative to insert to the test null operations such as nop. In some exemplary embodiments, a null instruction, such as nop, may be inserted to provide for a valid test in case that into a non-speculative branch no instructions are supposed to be placed based on the template. For example, referring again to the exemplary template, a speculative branch may begin before the load instruction and end in the load instruction. The template, however, does not define any additional instruction to be generated that may be placed in the non-speculative branch. A nop may be, therefore, inserted. See also the test given as example in connection to the nesting module 235. In some exemplary embodiments, the null instruction may be an instruction having substantially no effect on the DUT, such as a nop instruction. In some exemplary embodiments, the null instruction may be an instruction that is not deemed to have any substantial effect on the execution of the test by the DUT. In some exemplary embodiments, a user, such as 140 of FIG. 1, may provide for the null instruction. For example, a scenario termination sequence may be provided by the user to be inserted as a null instruction. The scenario termination sequence may comprise instructions that are not operable to modify outcomes that are used to validate correctness of execution of the test.

Figure 3:
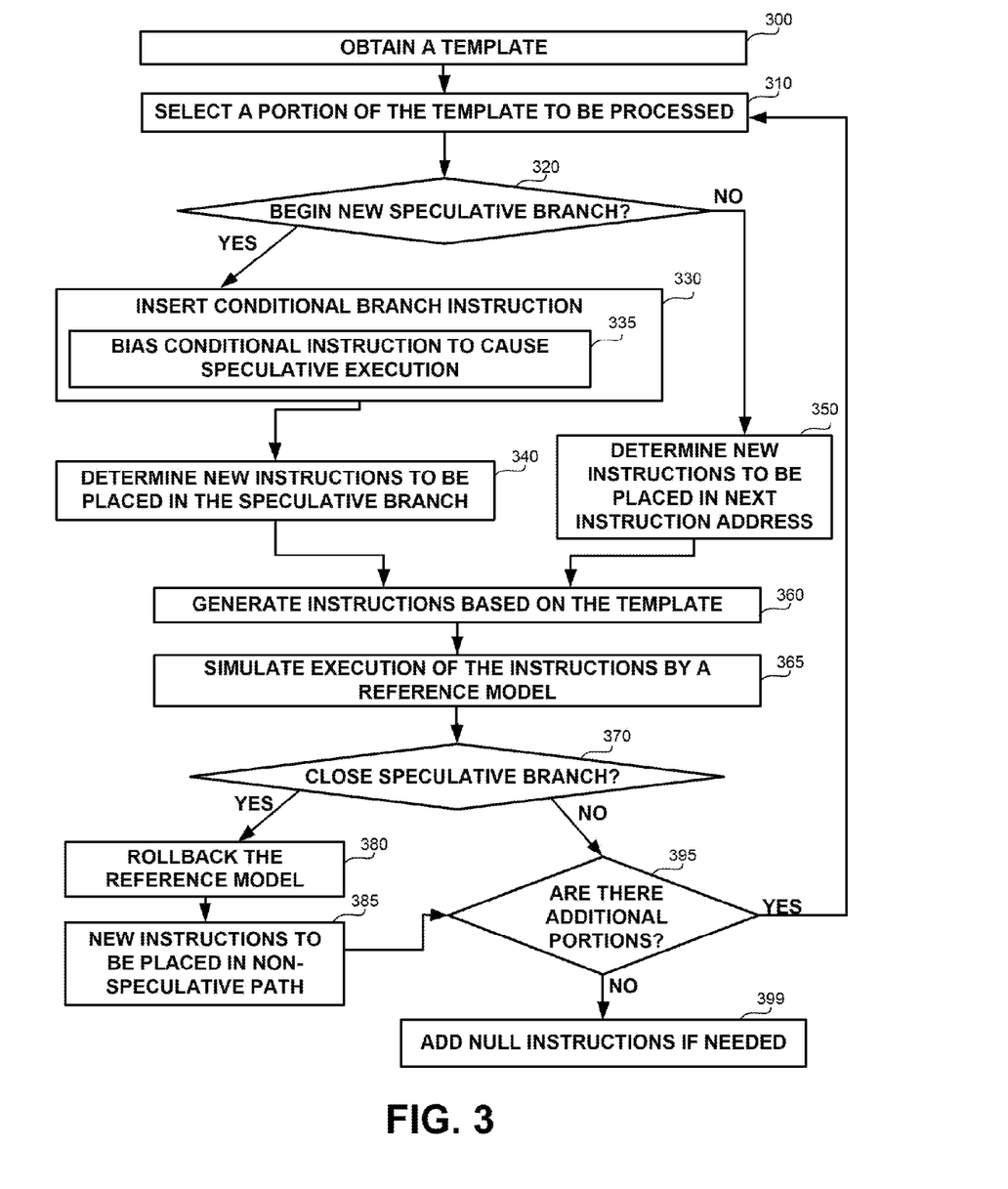
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a template may be obtained. The template may be obtained by a template obtainer, such as 210 of FIG. 2.

In step 310, a portion of the template may be selected for processing. Portions may be selected consecutively in different times in step 310, so that in total, the entire template is selected, in the order in which elements appear in the template, and each element of the template is selected once. In some exemplary embodiments, an element may be selected to appear both in a speculative branch leg and its counterpart non-speculative branch leg, wherein in each leg corresponding instruction may be generated independently so as to provide two different sets of instructions. The portion of the template may be selected by an apparatus, such as 200 of FIG. 2. The size of portion may be determined by a partitioning module, such as 220 of FIG. 2, which may determine a beginning and/or end to the portion. In some exemplary embodiments, the partitioning module may determine the beginning and/or end of the portion based on partitioning points in the template.

In step 320, a determination whether or not to begin a new speculative branch leg may be made. The determination may be random, pseudo-random, biased, non-deterministic or the like. The determination may be performed by a partitioning module, such as 220 of FIG. 2.

In step 330, in response to determining that a new speculative branch leg should begin, a branch instruction may be generated and inserted into the output test. The branch instruction may be a conditional branch instruction that is operative to provide for at least two alternative next instructions to be performed, based on a predetermined condition. The branch instruction may be inserted by a branch injector, such as 230 of FIG. 2.

In some exemplary embodiments, the conditional instruction may be biased in step 335 to cause speculative execution of one branch leg. Biasing of the conditional instruction may be a static bias or a dynamic bias. Biasing of the conditional instruction may be operative to cause speculative execution of the BNT of the branching instruction.

In step 340, a placing of the next instruction to be generated may be determined. The determination may be performed by an instruction placer, such as 260 of FIG. 2. The next instruction may be determined to be placed in a location that is associated with the BNT (be it the branch leg that is executed in case the condition is satisfied or the branch leg that is executed in case the condition is not satisfied). The instructions of the BNT may be executed during speculative execution of the test.

In step 350, in response to a determination not to begin a new speculative branch leg (step 320), a placing of the next generated instruction may be determined. The placing may be in the next instruction address to be executed. The next instruction address may be determined based on a program counter, instruction pointer or the like of a reference model of the DUT. The determination may be performed by an instruction placer, such as 260 of FIG. 2. It will be noted that the next instruction address may be either in a speculative branch leg or in a non-speculative branch leg, or not within a branch leg at all, depending on the location of the previously placed instruction.

In step 360, an instruction may be generated based on the portion of the template being processed. The instruction may be generated by an instruction generator, such as 250 of FIG. 2. The instruction may be generated by an invalid instruction generator, such as 257 of FIG. 2. In some exemplary embodiments, an invalid instruction may be generated only in case the new instruction is placed in a speculative branch leg.

In step 365, execution of the generated instruction may be simulated. The simulation may be performed in respect to a reference model of the DUT. The simulation may be performed by a reference model module, such as 255 of FIG. 2.

In some exemplary embodiments, a portion being processed may comprise a plurality of elements that are used to generate a plurality of instructions. For each such element, steps 360-365 may be performed iteratively, where each generated instruction is determined to be placed after the previously generated instruction (e.g. the placing determination is similar to that performed in step 350).

In step 370, a speculative branch leg may be determined to be "closed", therefore determining that no additional instructions are to be generated in the presently handled speculative branch leg. The closed speculative branch leg may be a nested speculative branch leg. Closing may be performed only in respect to a previously opened speculative branch leg. The determination of step 370 may be performed by a partitioning module, such as 220 of FIG. 2, as it may determine the boundaries of each speculative branch leg.

In step 380, in response to closing a speculative branch leg, a state of a reference model may be rolled back to revoke modifications caused to instructions that were simulated to be executed in the speculative branch leg. The rollback may be performed by a reference model module, such as 255 of FIG. 2.

In step 385, next instruction is set to be placed in the non-speculative branch leg, which is the counterpart of the speculative branch leg being closed. The placing determination may be performed by an instruction placer, such as 260 of FIG. 2.

It will be noted that placing determination in steps 340, 350 and 385 may be to place the instruction in a target address. The target address may be an address from which the DUT may read the next instruction (e.g., due to the branching instruction, jump instruction or the like).

In step 395, in case there are additional portions of the template to process, step 310 may be performed. Otherwise, step 399 may be performed.

In step 399, a null instruction may be added in the non-speculative branch leg, in case no instruction was inserted to the non-speculative branch leg. In some exemplary embodiments, a plurality of null instructions may be added, each associated with a different non-speculative branch leg. In some exemplary embodiments, several non-speculative branches may be unified into a single target address occupying a single null instruction. In some exemplary embodiments, the null instruction may comprise a set of instructions that are deemed as a scenario termination sequence.

The method of FIG. 3 may provide for nested speculative branch legs. The template may be processed one element after another, in accordance with the order defined in the template. A determination of a new speculative branch leg or to end a speculative branch leg may be associated with selecting a beginning or end of a portion in step 310. Instructions generated based on the portion are placed together in a new speculative branch leg (and therefore, a new branching instruction may be added in step 330), in the non-speculative counterpart branch leg (and therefore, prior to processing the portion, steps 380-385 may be performed), or before the first speculative branch leg. As this process may be performed iteratively, a speculative branch leg may originate from a previous speculative branch leg and therefore provide for a nested speculative branch legs.

In some exemplary embodiments, the method may further include determination of expected results of executing the tests. In response to simulating execution of the test or of actually executing the test, the expected results may be compared with actual/simulated results. A difference in the actual/simulated results and the expected results may be indicative of a bug.

Figure 4:
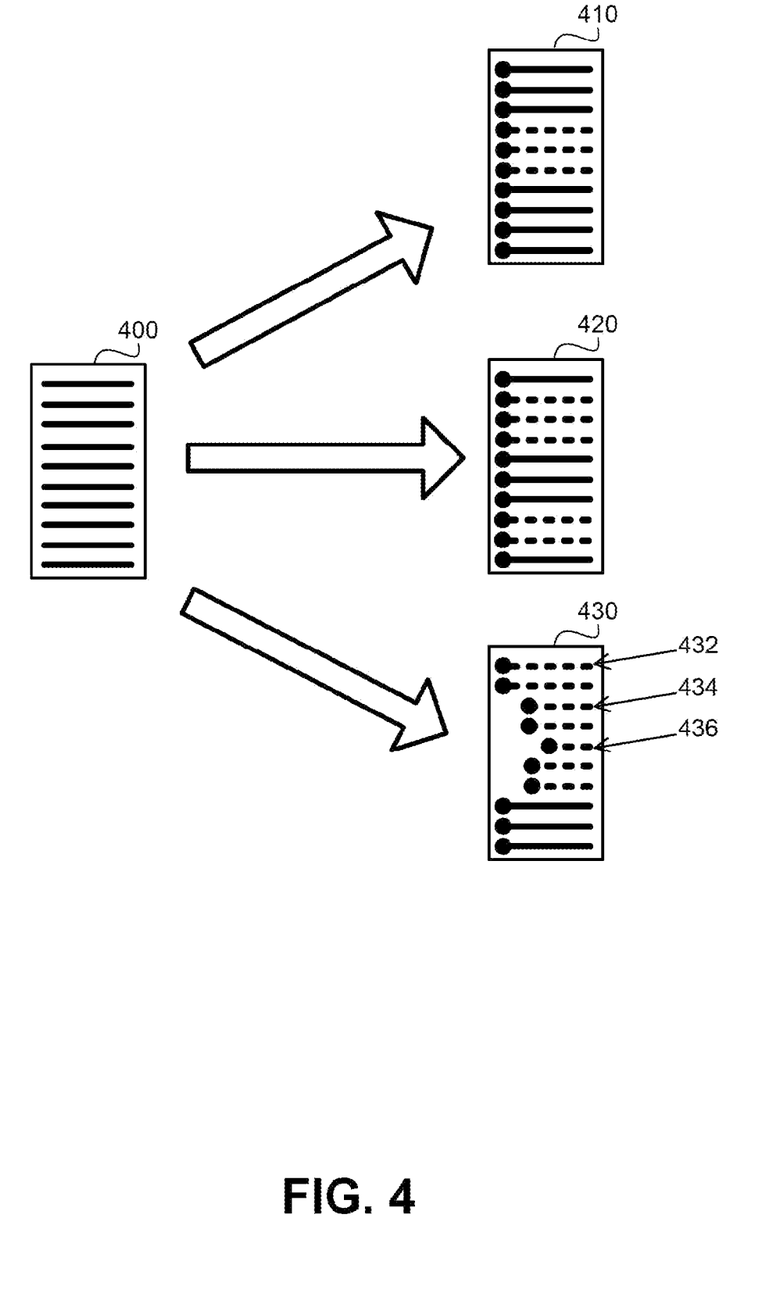
FIG. 4 shows exemplary tests generated based on a template, in accordance with some exemplary embodiments of the disclosed subject matter.

Referring now to FIG. 4 showing exemplary tests generated based on a template, in accordance with some exemplary embodiments of the disclosed subject matter.

A template 400 defines a set of elements, that based thereon, a generator, such as 120 of FIG. 1, may generate instructions. In accordance with the disclosed subject matter, based on the template, different tests may be generated, such as tests 410, 420 and 430. Each test may generate a different portion of the test so that that portion would be executed in speculative execution mode. Instructions that are to be executed during speculative execution are annotated as dashed lines.

Assuming that branch instructions are taken, but speculated to not be taken, test 410 comprises three instructions that are executed non-speculative manner, thereafter, a speculative branch leg of three instructions may be executed during speculative execution, thereafter there are four more additional instructions to be executed in non-speculative execution in the counterpart non-speculative branch leg. In between the speculative branch leg and the first three instructions, there may be a branching instruction that defines the speculative and non-speculative branch legs. The branching instruction is not shown in FIG. 4, as it does not correspond to any element in the template 400. In a similar manner, in tests 420 and 430 branching instructions, that define speculative and non-speculative branch legs, are not explicitly shown in FIG. 4. For ease of explanation, the branching instructions are not further mentioned below in regard to tests 420 and 430.

Assuming that branch instructions are taken, but speculated to not be taken, test 420 comprises an instruction that is executed in non-speculative manner, thereafter, a speculative branch leg of three instructions may be speculatively executed, thereafter there are three more additional instructions to be executed in non-speculative execution, and thereafter there is an additional speculative branch leg of two more instructions, followed by an additional instruction to be executed in a non-speculative manner.

The test 430 shows nested speculative branches. Nesting is annotated using indentation of the lines. Assuming that branch instructions are taken, but speculated to not be taken, test 430 comprises seven instructions that are executed in a speculative branch leg. Out of those seven instructions, the first two, beginning in instruction 432, are executed in the speculative branch leg. The following two instructions, beginning in instruction 434, are executed during a nested speculative branch leg. Within the nested speculative branch leg, there is an additional nested speculative branch leg which consists of instruction 436. After execution of the additional nested speculative branch leg, the control flow returns to its non-speculative counterpart branch leg comprising of two additional instructions. The counterpart non-speculative branch leg of the "main" speculative branch leg, consists of three instructions.

Referring again to the template provided above as an example, the following different tests may be generated based upon the aforementioned exemplary template:

Case 1: branch instructions are not injected. The generated test may adhere to the following flow:
store
noise instructions
load colliding with store Case 2: a branch instruction immediately before the beginning of the test. In this case there are several possible sub-options:

Case 2(a) The entire scenario is generated in the speculative path. The test may adhere to the following flow:
bc TARGET
store
noise instructions
load colliding with store
TARGET: nop Case 2(b): The speculative path may be spliced to provide for a nested speculative branch leg. The test may adhere to the following flow:
bc TARGET1
store
noise instructions
bc TARGET2
load colliding with store
TARGET2: nop
TARGET1: nop Case 2(c): The speculative path ends prior to the end of the scenario. The test may adhere to the following two exemplary flows:
bc TARGET
store
noise instructions
TARGET: load colliding with store
bc TARGET
store
TARGET: noise instructions
load colliding with store Case 3: The branching instruction may be inserted before the load instruction. The test may adhere to the following flow:
store
noise instructions
bc TARGET
load colliding with store
TARGET: nop The flows provided above are provided as a way of example only, and the scope of the disclosed subject matter should not be limited to these examples.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for generating a test for a Design-Under-Test (DUT) based on a template, wherein the method is performed by a processor, the method comprising:

partitioning the template into at least a first portion and a second portion, wherein the first portion is determined to be executed in speculative execution by the DUT;

injecting a branch instruction operative to cause the DUT to perform speculative execution, the branch instruction defines at least a speculative branch leg and a non-speculative branch leg, wherein the DUT is operative to perform speculative execution of the speculative branch leg;

generating a first set of instructions based on the first portion of the template, wherein the first set of instructions is placed in the speculative branch leg;

generating an invalid instruction as part of the first set of instructions;

simulating, by a reference model of the DUT, speculative execution of the first set of instructions, as well as, simulating execution of the invalid instruction in speculative execution;

rolling back the reference model to revoke the speculative execution prior to generating a second set of instructions, and to further revoke simulated execution of the invalid instruction; and generating the second set of instructions, wherein the second set of instructions is placed in the non-speculative branch leg.

2. The computer-implemented method of claim 1, wherein said injecting, said generating the first set and said generating the second set are performed a plurality of times.

3. The computer-implemented method of claim 2, wherein performing said injecting, said generating the first set and said generating the second set comprises:

partitioning the first portion into a first sub portion and a second sub portion; and wherein said generating the first set of instructions comprises injecting a second branch instruction operative to cause the DUT to perform speculative execution; the second branch instruction defines at least a second speculative branch leg and a second non-speculative branch leg, wherein the DUT is operative to perform speculative execution of the second speculative branch leg;

whereby a nested speculative branch leg is generated.

4. The computer-implemented method of claim 2, further comprising: retrieving a predetermined threshold number of speculative branch legs to be generated.

5. The computer-implemented method of claim 2, further comprising determining a number of maximum nesting of speculative execution performed by the DUT, and wherein the method is performed so as to generate a test operative to invoke the number of maximum levels of nested speculative executions.

6. The computer-implemented method of claim 1, wherein said generating the second set of instructions comprises simulating, by the reference model of the DUT, non-speculative execution of the second set of instructions.

7. The computer-implemented method of claim 1, wherein the template comprises annotations indicative of partitioning points; and wherein said partitioning partitions the template by selecting a partitioning point.

8. The computer-implemented method of claim 1, wherein said injecting comprises determining a target address for the branch instruction; and wherein either the speculative branch leg or the non-speculative branch leg begin in the target address.

9. The computer-implemented method of claim 1, further comprising generating a null instruction in the beginning of the non-speculative branch leg.

10. The computer-implemented method of claim 1, further comprising: simulating execution, by a simulator, of the generated test; wherein during said simulating, speculative execution of the speculative branch leg is simulated, thereafter, rolling back of the speculative execution is performed and, thereafter, execution of the non-speculative branch leg is simulated.

11. The computer-implemented method of claim 10, further comprising determining expected results of executing the generated test; and in response to said simulating execution comparing excepted results with simulated results to indicate an existence of a bug in the DUT.

12. The computer-implemented method of claim 1, wherein said generating the second set of instructions is either based on the first portion or on the second portion.

13. The computer-implemented method of claim 1, wherein the branch instruction is an implicit branch instruction.

14. A computerized apparatus having a processing unit and a computer readable memory, the apparatus comprising:
a template obtainer operative to obtain a template descriptive of a test scenario for a Design-Under-Test (DUT);
a partitioning module operative to partitioning the template into at least a first portion and a second portion, wherein the first portion is determined to be executed in speculative execution by the DUT;
a branch injector operative to inject a branch instruction to the test, wherein the branch instruction is operative to cause the DUT to perform speculative execution, the branch instruction defines a speculative branch leg and a non-speculative branch leg, wherein the DUT is operative to perform speculative execution of the speculative branch leg;
an instruction generator operative to generate instructions based on the template, wherein instruction generator further comprises an invalid instruction generator operative to generate an invalid instruction, wherein the invalid instruction is to be placed in the speculative branch leg;
an instruction placer operative to place the generated instructions in the test, wherein the instruction placer is operative to place instructions associated with the first portion in the speculative branch leg;
a reference model module, operative to simulate execution of the invalid instruction, and further operative to simulate rollback of the simulated execution of the invalid instruction.

15. The computerized apparatus of claim 14, wherein said branch injector is operatively coupled to a nesting module, wherein the nesting module is operative to invoke said branch injector to provide for nested speculative branch legs.

16. The computerized apparatus of claim 15, wherein said nesting module is configured to provide for a maximum number of nested speculative executions that the DUT is designed perform.

17. The computerized apparatus of claim 14, wherein the template comprises indications of possible partitioning points; and wherein said partitioning module is operative to partition the template based on the possible partitioning points.

18. The computerized apparatus of claim 14 further comprising a reference model module operative to simulate an expected state of the DUT during generation; and wherein said reference model module is operatively coupled to said instruction generator.

19. The computerized apparatus of claim 18, wherein said reference model module is operative to perform a rollback of modifications to the expected state of the DUT made during speculative execution.

20. A computer program product generating a test for a Design-Under-Test (DUT) based on a template, the product comprising:
a non-transitory computer readable medium;
a first program instruction for partitioning the template into at least a first portion and a second portion, wherein the first portion is determined to be executed in speculative execution by the DUT;
a second program instruction for injecting a branch instruction operative to cause the DUT to perform speculative execution, the branch instruction defines at least a speculative branch leg and a non-speculative branch leg, wherein the DUT is operative to perform speculative execution of the speculative branch leg;
a third program instruction for generating a first set of instructions based on the first portion of the template, wherein the first set of instructions is placed in the speculative branch leg, wherein the third program instruction is further adapted to generate an invalid instruction, wherein the invalid instruction is to be placed in the speculative branch leg;
a fourth program instruction for generating a second set of instructions, wherein the second set of instructions is placed in the non-speculative branch leg;
a fifth program instruction, operative to simulate execution of the invalid instruction, and further operative to simulate rollback of the simulated execution of the invalid instruction; and
wherein said first, second, third and fourth program instructions are stored on said computer readable medium.

* * * * *